US008380234B2

(12) United States Patent  (10) Patent No.: US 8,380,234 B2
Kronander et al.  (45) Date of Patent: Feb. 19, 2013

(54) METHOD AND APPARATUS FOR TRANSMITTING AVAILABLE RADIO ACCESS POSSIBILITIES IN A COMMUNICATIONS AREA

(75) Inventors: Jonas Kronander, Uppsala (SE); Yngve Selén, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 12/926,855

(22) Filed: Dec. 14, 2010

(65) Prior Publication Data

US 2012/0064902 A1  Mar. 15, 2012

Related U.S. Application Data

(63) Continuation-in-part of application No. 12/881,901, filed on Sep. 14, 2010.

(51) Int. Cl.
*H04B 7/00*  (2006.01)
(52) U.S. Cl. .............. 455/509; 455/450; 455/452.1; 370/338; 370/329; 709/218; 709/249
(58) Field of Classification Search ............ 455/437, 455/450, 452.1, 101, 509, 422.1, 435.2, 63.2, 455/525, 517, 434, 515; 370/328, 294, 310.2, 370/315, 321, 326, 329, 336–338, 345, 347; 709/221, 224, 218, 231, 203, 249, 232, 238
See application file for complete search history.

(56) References Cited

U.S. PATENT DOCUMENTS 7,002,942 B2 * 2/2006 Kotzin ..................... 370/338
2004/0218605 A1 * 11/2004 Gustafsson et al. ....... 370/395.2

(Continued)

FOREIGN PATENT DOCUMENTS

GB  2 452 690  3/2009
WO  WO 2008/037277  4/2008

(Continued)

OTHER PUBLICATIONS

The $E^2R$ II Flexible Spectrum Management (FSM) Framework and Cognitive Pilot Channel (CPC) Concept—Technical and Business Analysis and Recommendations, End to End Reconfigurability II ($E^2R$ II) White Paper—Nov. 7, pp. 1-52.

(Continued)

*Primary Examiner* — Sujatha Sharma
(74) *Attorney, Agent, or Firm* — Nixon & Vanderhye P.C.

(57) ABSTRACT

The technology described in this application provides a wide-area radio access information transmission scheme where the wide-area radio access information transmitter shares its radio resources with local radio access information transmitters. The radio resources may be divided for example in one or more of the time, frequency, space, and/or code domains. The wide-area radio access information transmitter sets aside and does not use some portions or "chunks" of its radio resources and allocates those unused portions or chunks for use by local radio access information transmitters to transmit local radio access information signals. In one non-limiting example embodiment, the radio resources include time slots, and during those time slots allocated to the local radio access information transmitters, the wide-area radio access information transmitter does not transmit, and thus, is quiet. Hence, those allocated time slots are referred to as "quiet periods" from the perspective of the wide-area radio access information transmitter. The wide-area radio access information transmitter can optionally explicitly signal what those resources are to simplify for the local radio access information transmitters who otherwise have to detect those resources themselves.

24 Claims, 7 Drawing Sheets

U.S. PATENT DOCUMENTS

| | | | |
|---|---|---|---|
| 2006/0026268 A1* | 2/2006 | Sanda | 709/221 |
| 2008/0020792 A1 | 1/2008 | Falk et al. | |
| 2009/0059874 A1* | 3/2009 | Carter | 370/338 |
| 2010/0202387 A1 | 8/2010 | Sawai et al. | |
| 2011/0070885 A1* | 3/2011 | Ruuska et al. | 455/434 |
| 2012/0064930 A1* | 3/2012 | Kronander et al. | 455/509 |

FOREIGN PATENT DOCUMENTS

| | | |
|---|---|---|
| WO | WO 2008/119380 | 10/2008 |
| WO | WO 2010/092049 | 8/2010 |

OTHER PUBLICATIONS

Raphael Rom et al., "Multiple Access Protocols: Performance and Analysis", Springer-Verlag, New York (1990). Chapter 4: Career Sensing Protocols, pp. 79-103; http://www.comnet.technion.ac.il/rom/PDF/MAP.pdf.

International Search Report and Written Opinion of the International Searching Authority mailed Jan. 26, 2012 in corresponding Application No. PCT/SE2011/060997.

* cited by examiner

METHOD AND APPARATUS FOR TRANSMITTING AVAILABLE RADIO ACCESS POSSIBILITIES IN A COMMUNICATIONS AREA

RELATED APPLICATION

This application is a continuation-in-part of U.S. application Ser. No. 12/881,901, filed on Sep. 14, 2010, the contents of which are incorporated herein by reference.

TECHNICAL FIELD

The technical field relates to radio communications, and more particularly, to transmitting available radio access possibilities in a communications area.

BACKGROUND

In a typical cellular radio system, wireless terminals (also known as mobile stations and/or user equipment units (UEs)) communicate via a radio access network (RAN) to one or more core networks. The radio access network (RAN) covers a geographical area divided into cell areas, with each cell area being served by a base station, e.g., a radio base station (RBS), which in some networks may also be called, for example, a "NodeB" (UMTS) or "eNodeB" (LTE). So a cell is a geographical area where radio coverage is provided by the radio base station equipment at a base station site. Future RANs may look different in that a single UE may be served by multiple RBSs. Each cell is identified by an identity within the local radio area, which is broadcast in the cell. The base stations communicate over the air interface operating on radio frequencies with the user equipment units (UE) within range of the base stations. In some versions of a radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The number of radio access technologies available for uses such as cellular telephony and mobile broadband has grown rapidly in the later years. In the beginning of the 1990's there were only a few standards available, such as NMT, GSM and IS-95, used almost exclusively for voice telephony. Many additional radio access technologies (RATs) have been developed, such as W-CDMA, CDMA2000, EDGE, IEEE 802.16 and LTE. A multi-mode user terminal that can use several different RATs, such as the examples above, obtains improved coverage, e.g., so that users can use their terminals when traveling.

In this heterogeneous RAT environment, there is also a regulatory interest towards increasing flexibility in spectrum allocations with the advantage that the radio environment can be adapted to current usage patterns, and thus, limited radio resources can be more efficiently used. As a result, different RATs may be allocated to different frequencies in different locations, and these allocations may change over time.

FIG. 1 illustrates a heterogeneous RAT environment where a user equipment (UE) 12 may obtain service from multiple base stations (BSs) 14 that offer different radio access technologies (RATs). For example, one base station offers one RAT, DVB-H, on frequency band F1.1. Another base station offers two RATs: GSM on frequency band F2.1 and UMTS on frequency band F2.2. The remaining base station offers three RATs: WiFi on frequency band F3.1, GSM on frequency band F3.2, and UMTS on frequency band F3.3. As the question marks above the UE 12 indicate, one problem is to determine how to inform UEs about the specific RAT offerings and associated frequency bands.

One way to distribute information in radio environments with multiple RATs in a geographic region so that UEs can determine (1) available RATs and (2) how to connect to them is to use a Cognition enabling Pilot Channel (CPC). A wide-area CPC transmitter broadcasts, using a particular RAT and frequency already known to the UEs, information identifying which RATs (e.g., GSM, UMTS, W-CDMA, LTE, WiFi, and/or WiMax, etc.) are available and at what different frequencies in the different locations in a service area served by the CPC transmitter. The CPC transmitter may transmit using different frequencies than the frequencies used by the RATS and for that reason may be called an out-of-band wide-area CPC transmitter.

One example way of dividing a wide-area radio access information service area up is in quadratic area elements like the mesh shown in FIG. 2. A wide-area radio access information broadcast transmitter 18 transmits information for all of the mesh areas included in a service area 10. The wide-area transmitter 18 transmits information for each mesh element "i" that includes location information of the mesh element, operator information, RAT information, frequency ranges associated with each RAT, and whether secondary usage is allowed and under what rules. Secondary usage refers to a situation where a UE is allowed to operate in a frequency band licensed to a certain RAT and/or operator but without connecting to that RAT and/or operator. Instead, the UE uses the frequency band for other communication purposes, e.g., for device-to-device communication with another party. Generally, secondary usage of frequency bands assumes that the UE (secondary user) somehow ensures that the quality of the primary service offered on the band is not degraded due to interference caused by the secondary usage.

With the introduction of more flexible and adaptable connection possibilities in UEs and the more dynamic spectrum arena that is likely to become reality in the future, the market for the introduction of local Dynamic Spectrum Access (DSA) hotspots becomes more attractive. A hotspot is a radio base station with small coverage and typically high capacity; one example is a WiFi hotspot at a coffee shop. A hotspot may, by using dynamic spectrum access mechanisms for example, obtain access to spectrum bands with more favorable propagation characteristics than what is provided by today's ISM band. Moreover, DSA hotspots could use discontiguous spectrum and aggregate a large bandwidth allowing for very high throughput.

To connect to a hotspot today, e.g., a WLAN hotspot, a UE needs to scan for hotspots in a limited frequency range. Even though the hotspot frequency band and the RAT used by the hotspot are already established, this scanning can still be rather slow and power consuming. But if DSA is used, a UE wanting to connect to a DSA hotspot has even less information on where, in frequency, to scan for the hotspot or on what RAT is used by the DSA hotspot. The effect is a significant increase in the average scanning time and hence in connection time for users wanting to connect to the DSA hotspot resulting in lower user satisfaction, which is a significant drawback for the hotspot operators.

To better attract users, it would be desirable for a DSA hotspot to efficiently announce its presence to nearby UEs and for UEs to be able to quickly connect to the hotspot without a time and energy consuming spectrum scanning. Otherwise, potential customers may not find the hotspot.

The CPC could solve these problems by announcing to a UE on what frequencies it can connect to the hotspot and what RATs the hotspot is using. However, a wide-area CPC transmitter like that shown in FIG. 2 will have problems coping with many local DSA hotspots because of the large amount of information processing and transmission involved.

Furthermore, a wide-area CPC approach requires some degree of UE positioning meaning that a UE needs to know which CPC information is relevant for its present location. Since a hotspot typically has a small service area, that positioning has to be rather precise. Particularly for indoor use, which is where many hotspots are expected to be located, this could be a problem because GPS and similar positioning systems do not work indoors. Setting a high requirement on positioning precision may also be limiting to outdoor users since more complex UEs might be required (e.g., integrated GPS).

Other problems include that as local DSA hotspots change their operating frequencies and/or change the RAT(s) used to a dynamic local (in both time and space) frequency spectrum situation, it will be difficult to keep this information updated in a wide-area CPC transmitter. Moreover, the hotspot owner may, for various reasons, not want to register their DSA hotspot to the entity that manages the wide-area broadcast CPC transmitter. One reason may be that the wide-area CPC transmitter might be managed by competitors of the hotspot owners. In addition, there may be many DSA hotspots present in the service area of the wide-area CPC transmitter. This means that the total amount of information to be transmitted by the wide-area CPC transmitter will be large and that it will be both time and battery consuming for UEs to listen to the CPC transmissions until relevant information becomes available (hence, the CPC solution would give the same problems as it was designed to solve).

SUMMARY

The technology described in this application solves these and other problems using a wide-area radio access information transmission scheme where the wide-area radio access information transmitter shares its radio resources with local area radio access information transmitters (LARAITs). The radio resource sharing may be implemented using any suitable sharing technique. The radio resources may be divided for example in one or more time, frequency, space, and/or code domains. The wide-area radio access information transmitter (WARAIT) sets aside and does not use some portion or "chunk" of its radio resources. Those unused portions or chunks are used by LARAITs to transmit local radio access information signals. In one non-limiting example embodiment, the radio resources include time slots, and during those time slots allocated to the LARAITs, the WARAIT does not transmit, and thus, is quiet. Hence, those allocated time slots are referred to as "quiet periods."

One aspect of the technology includes an LARAIT for use in a communications area serviced by one or more different radio access technologies (RATs) allocated to different radio resources in different locations in the communications area. Each RAT is associated with one or more RAT radio transceivers for serving user equipments (UEs) at least in some portion of the communications area using at least one of the multiple RATs, the local radio access information transmitter being in addition to the RAT radio transceivers and located near an associated hotspot service area at least partly inside the communications area. The LARAIT includes a receiver configured to receive broadcast information from a WARAIT which has a set of WARAIT radio resources available for use by the WARAIT. Processing circuitry in the LARAIT is configured to determine local radio access information including one or more different RATs available for UE service in the hotspot service area and a frequency or frequencies of operation allocated to each RAT in the hotspot service area and to determine from the set of WARAIT radio resources at least one WARAIT radio resource that the WARAIT is not using. LARAIT radio transmission circuitry transmits the local radio access information signals for receipt by UEs in the hotspot service area using the determined at least one WARAIT radio resource. The determined WARAIT radio resource(s) may include one or more of a time period, a frequency band, or a code.

In one example embodiment, the receiver receives signals from the WARAIT that explicitly identify one or more of the WARAIT radio resources not being used by the WARAIT transmitter. In another example embodiment, the receiver to determines without explicit signaling from the WARAIT one or more of the WARAIT radio resources not being used by the WARAIT transmitter.

In an example embodiment, the LARAIT shares the WARAIT radio resource(s) with one or more other LARAITs in the communications area. In that case, the processing circuitry uses a multiple access protocol to avoid a collision with the other LARAIT(s) when transmitting using the at least one WARAIT radio resource. If the WARAIT has allocated multiple WARAIT radio resources for use by the local radio access information transmitter, the processing circuitry may select a subset of the allocated multiple WARAIT radio resources so that the radio transmission circuitry transmits the local area radio access information signals using the selected subset of the allocated multiple WARAIT radio resources.

In another example embodiment, the processing circuitry generates signaling for transmission to another local radio access information transmitter to coordinate use of one or more WARAIT radio resources not being used by the wide-area radio access information transmitter.

Another aspect of the technology includes a method implemented in an LARAIT in a communications area serviced by one or more different RATs allocated to different radio resources in different locations in the communications area. The method includes the steps of:

receiving broadcast information from a WARAIT which includes a set of WARAIT radio resources;

determining local area radio access information including one or more different RATs available for UE service in a hotspot service area within the communications area and a frequency or frequencies of operation allocated to each RAT in the hotspot service area;

determining from the set of WARAIT radio resources at least one WARAIT radio resource that the WARAIT is not using; and transmitting the local area radio access information signals for receipt by UEs in the hotspot service area using the determined at least one WARAIT radio resource.

In one example embodiment, the method includes receiving signals from the WARAIT that explicitly identify one or more of the WARAIT radio resources not being used by the WARAIT transmitter.

In another example embodiment, the method includes determining without explicit signaling from the WARAIT one or more of the WARAIT radio resources not being used by the WARAIT transmitter.

In yet another example embodiment, the method includes signaling with another LARAIT to coordinate use of one or more WARAIT radio resources not being used by the wide-area radio access information transmitter.

Another aspect of the technology includes a WARAIT for use in a communications area serviced by multiple different RATs allocated to different radio resources in different locations in the communications area. The WARAIT includes processing circuitry configured to determine wide-area radio access information including different RATs available for UE service in different locations in the communication area and one or more frequencies of operation allocated to each RAT in each location. Transmission circuitry is configured to transmit the wide-area radio access information over the communications area using WARAIT radio resources. The processing circuitry is configured to identify one or more WARAIT radio resources for possible use by one or more LARAITs and to control the transmission circuitry to transmit the wide-area radio access information over the communications area using only WARAIT radio resources not identified for possible use by any of the LARAITs.

In one example embodiment, each LARAIT is a cognition enabling pilot channel (CPC) transmitter and/or the wide-area radio access information transmitter is a CPC transmitter and the hotspot service area is a region surrounding a dynamic spectrum access (DSA) hotspot device.

In another example embodiment, the processing circuitry allows the LARAIT to discover the identified one or more WARAIT radio resources. In another example embodiment, the identified one or more WARAIT resources are identified in the WARAIT transmissions.

Another aspect of the technology includes a method for use in a to communications area serviced by multiple different radio access technologies (RATs) allocated to different radio resources in different locations in the communications area. The method includes the steps of:

determining wide-area radio access information including different RATs available for UE service in different locations in the communication area and radio resources allocated to each RAT in each location;

identifying one or more WARAIT radio resources for possible use by one or more of the multiple local radio access information transmitters; and transmitting the wide-area radio access information over the communications area using the WARAIT radio resources other than the identified one or more WARAIT radio resources.

In one example embodiment, the method includes allowing the LARAIT to discover the identified one or more WARAIT radio resources. In another example embodiment, the identified one or more WARAIT resources are identified in the WARAIT transmissions. Still further, the identified one or more WARAIT radio resources may be transmitted for LARAIT use. In one example embodiment, the method includes adding information to the WARAIT transmission on what radio resources and what type of radio resources are allowed for use by LARAITs.

DETAILED DESCRIPTION

Figure 1:
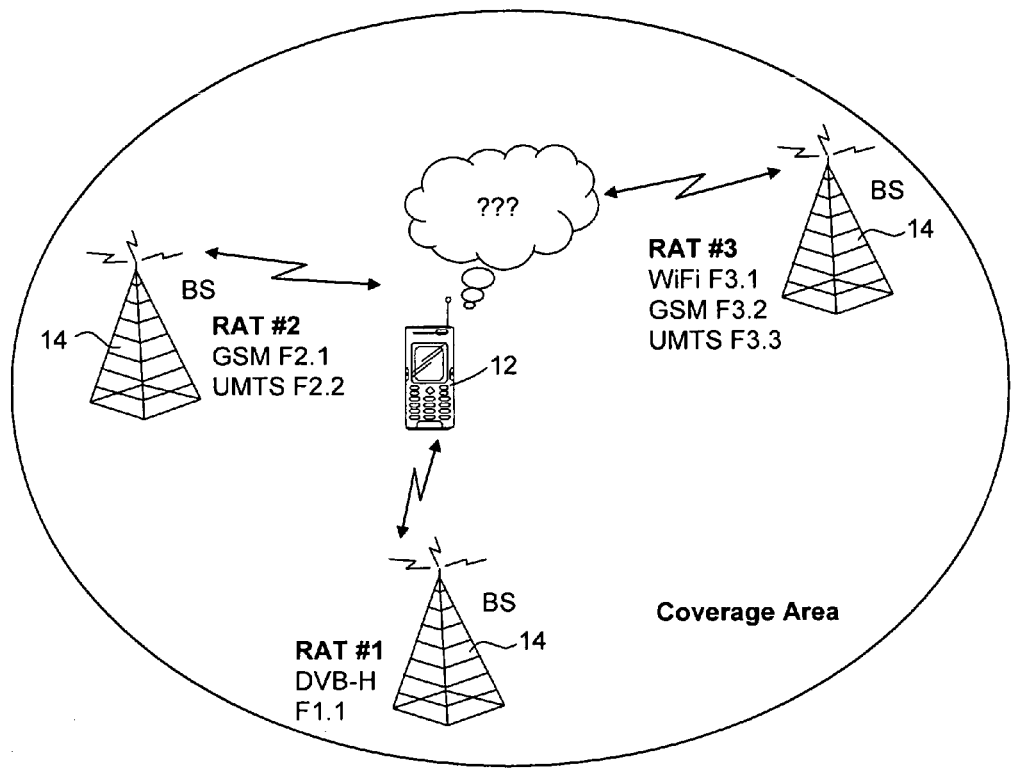
FIG. 1 illustrates a non-limiting example of a heterogeneous RAT environment where a user equipment may obtain service using different radio access technologies (RATs)

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that to the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller" may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 2:
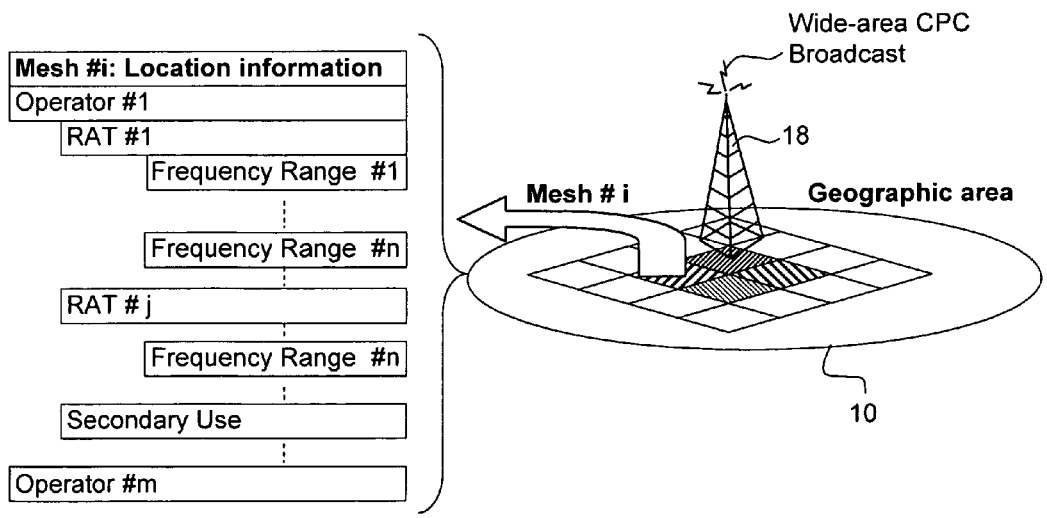
FIG. 2 illustrates a mesh of locations areas that may be used by a wide-area radio access information transmitter (WARAIT) to inform UEs about available RATs and associated frequencies for a particular mesh element/location.
Figure 3A:
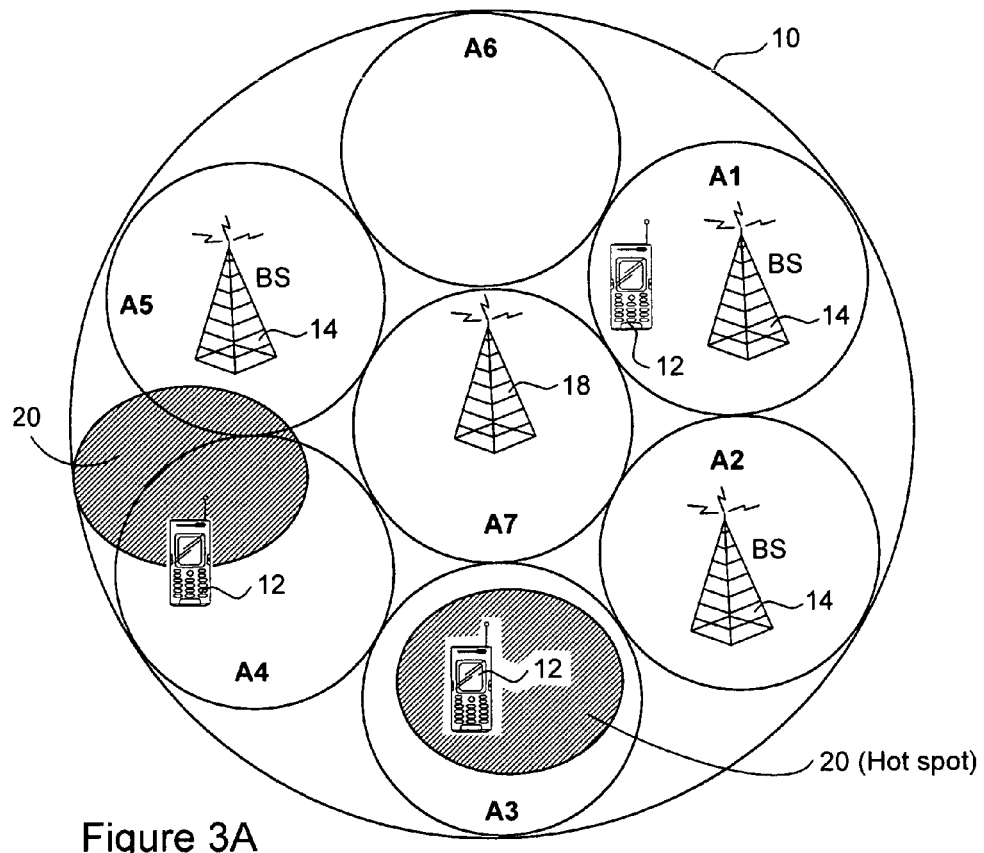
FIG. 3A is a non-limiting example diagram showing a service area of a WARAIT with multiple areas (similar to multiple mesh elements) and two hotspots service areas.

FIG. 3A is a non-limiting example diagram showing a wide-area radio access information transmitter (WARAIT) service area 10 of the WARAIT 18 with multiple smaller areas A1-A7 and two hotspot service areas 20. The smaller areas A1-A7 may be like the multiple mesh elements used to partition the service area of the WARAIT as shown in FIG. 2 or each smaller area be could correspond to a service area of a base station or a RAT. One hotspot service area is shown overlapping two smaller areas A5 and A4, and the other is contained within one smaller area A3. More or fewer hotspots may be present. The size of the service area of the hotspot may be on the same order as that of a smaller area, but not necessarily. Multiple base stations (BSs) 14 are shown in the WARAIT service area in example smaller areas A1, A2, and A5 and use different radio access technologies (RATs). Non-limiting examples of different RATs are shown in FIG. 1. Each RAT is associated with a corresponding frequency or frequencies. The term base station is only used for convenience and encompasses any suitable radio transceiver that communicates using a RAT like access points, NodeBs, eNodeBs, etc. While every smaller area A1-A7 could be associated to the coverage of a base station, another scenario is that a base station provides service for multiple smaller areas. In FIG. 3A, for example, the base station 14 in area A5 might provide service to smaller areas A5, A4, A6, and/or A7.

Also in the WARAIT service area 10 is a wide-area radio access information transmitter 18 that transmits over the WARAIT service area 10, wide-area radio access information for each of the smaller areas A1-A7 in the WARAIT service area 10. The wide-area radio access information transmitter 18 preferably broadcasts, using a particular RAT at a particular frequency, information identifying which RATs (e.g., GSM, UMTS, W-CDMA, LTE, WiFi, and/or WiMax, etc.) are available at what frequencies in each smaller area A1-A7. Although not necessary, the wide-area radio to access information transmitter 18 preferably transmits using a different frequency than the frequencies used by the RATs that are available to provide service in the WARAIT service area 10. If this is the case, the wide-area radio access information transmitter 18 may be called an out-of-band wide-area transmitter. By tuning to the wide-area radio access information transmitter's transmissions, UEs 12 can determine the available RATs and associated frequencies for the area(s) of interest to the UEs, e.g., near the respective UE.

Although frequencies are used as examples of radio resources, different types of radio resources may be used by the wide-area transmitter 18 for transmitting the radio access information relating to different areas such as frequencies, time periods, codes, antennas, etc. For example, a timeslot "a" could be used to transmit information on which RATs are available in an associated smaller area, timeslot "b" could transmit information related to a different smaller area, and so on.

Figure 3B:
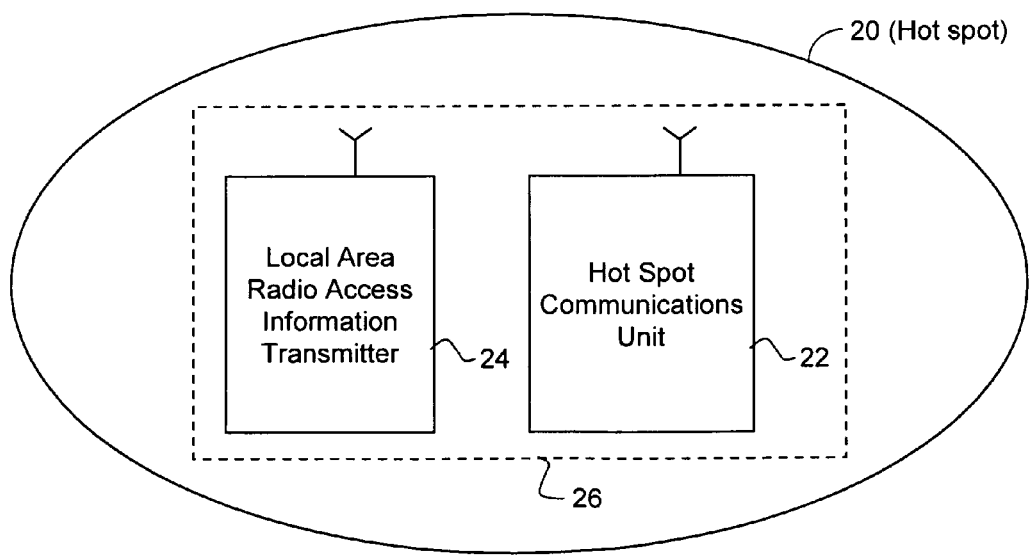
FIG. 3B is a non-limiting example diagram of a hotspot with a hotspot communications unit and local radio access information transmitter.

FIG. 3B is a non-limiting example diagram of a hotspot service area 20 from FIG. 3A and includes a hotspot communications unit 22 and local radio access information transmitter 24. The hotspot communications unit 22 includes one or more radio transceivers and typically (though not necessarily) uses one RAT and one or more associated frequencies. The local radio access information transmitter 24 is preferably inexpensive and co-located with the hotspot communications unit 22. It may be located separately from the hotspot communications unit 22, or it may be co-located with the hotspot communications unit 22 as shown by the dotted box 26, or even integrated in the hotspot communications unit 22 and possibly using, at least partly, the same hardware, such as transmit antenna. The local area radio access information transmitter (LARAIT) 24 transmits radio access (RA) information on how to connect to the local DSA hotspot 22 including information a UE needs to establish a connection to the RAT(s) that the hotspot is currently using such as the RAT(s) and its associated frequenc(ies). Preferably though not necessarily, the local area radio access information transmitter (LARAIT) 24 transmits in the same frequency band(s) as the WARAIT. But, as explained below, the WARAIT and LARAIT may use different frequency or other radio resources within the same bands. In other words, a quiet period may be defined in any radio resource domain such as time, frequency, code, etc.

It will be appreciated that a WARAIT service area 10 may well have many LARAITs 24. Although the WARAIT controller is assumed to be co-located with the wide-area radio access information transmitter in the description, it need not be.

A UE 12 in or near the hotspot service area 20 can quickly detect, receive, and decode the local area radio access information signal from the LARAIT 24 and use that information to connect to the local hotspot 22 without having to scan multiple frequencies associated with other hotspots and/or base stations that the UE 12 will likely not want to use. This eliminates the time and battery consuming scanning process described in the background section.

Figure 4:
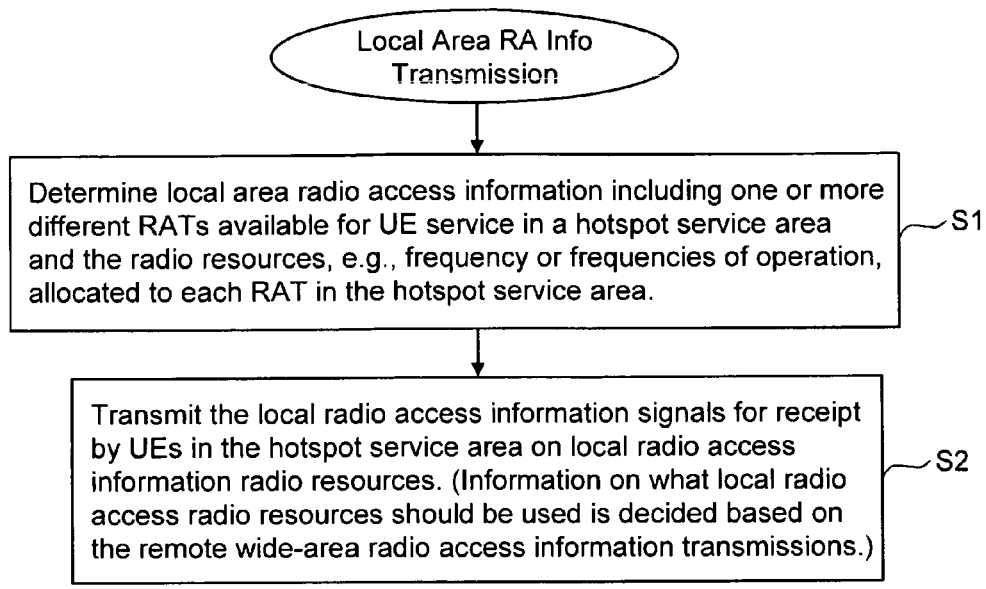
FIG. 4 illustrates a flowchart diagram with non-limiting example procedures for local radio access information transmission.

FIG. 4 illustrates a flowchart diagram with non-limiting example procedures for local area radio access information transmission. In step S1, local area radio access information is determined including one or more different RATs available for UE service in the vicinity of a hotspot service area 20 within the WARAIT service area 10 and radio resources, e.g., frequenc(ies) of operation, allocated to each RAT in the hotspot service area. The local area radio access information signals are transmitted for receipt by UEs in the hotspot service area 20 on local area radio access information radio resources (step S2). The local area radio access information transmitter listens to wide-area radio access information transmissions and identifies "quiet periods" when the wide-area radio access information transmitter does not transmit. Alternatively, the wide-area radio access information transmissions may directly include information regarding what radio resources (e.g., time slots, frequencies and/or codes) that can be used by the LARAITs for transmitting local radio access information. Yet another alternative is that information is known beforehand by the UE, e.g., standardized. In the example embodiments described further below, the local radio access information radio resources to be used are radio resources that the remote wide-area radio access information controller decides it will not use itself, but instead remains "quiet," so that a local radio access information transmitter can transmit the local radio access information without interference from the WARAIT.

Figure 5:
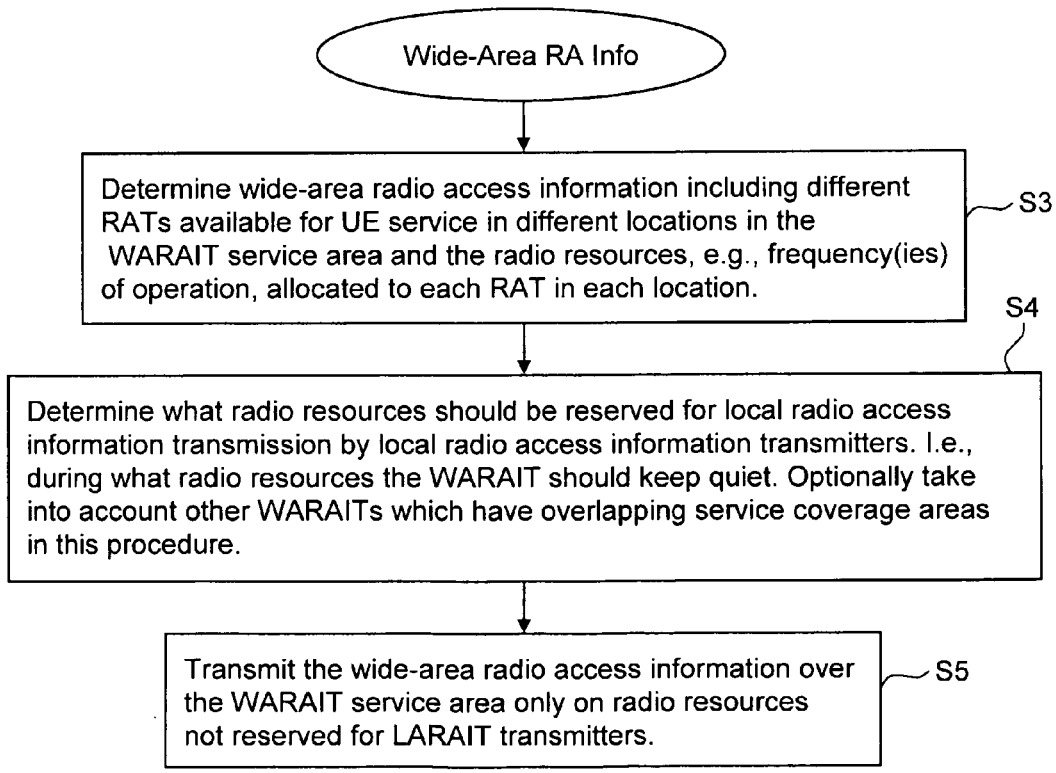
FIG. 5 illustrates a flowchart diagram with non-limiting example procedures for wide-area radio access information transmission.

FIG. 5 illustrates a flowchart diagram with non-limiting example procedures for wide-area radio access information transmission. Wide-area radio access information is determined that includes different RATs available for UE service in different locations of the WARAIT service area and one or more frequencies of operation allocated to each RAT in each location (step S3). Then, it is determined in step S4 what radio resources should be reserved for local area radio access information transmission by LARAIT(s), i.e., radio resources the WARAIT should not use. The WARAIT does not use those locally-reserved WARAIT radio resources for its broadcasts during which the WARAIT remains "quiet," and transmits the wide-area radio access information only using WARAIT radio resources that are not reserved (step S5). The WARAIT may broadcast specifically the information on what radio resources are reserved for/allocated to LARAIT usage, or the WARAIT may simply leave these radio resources empty (not transmit using those resources) and leave it for the LARAITs to detect what radio resources are reserved or available for LARAIT usage.

In another non-limiting example embodiment, multiple WARAITs may be deployed such that their coverage overlaps. The quiet periods for multiple WARAITs are synchronized. Thus, in step S4, the WARAIT may also coordinate with other WARAITs that have coverage overlapping with the coverage of the first WARAIT to synchronize what radio resources should be reserved for/allocated to LARAIT usage. Such synchronization may be achieved either through a central controller located externally to or in one of the wide-area transmitters or through signaling between the wide-area transmitters. Although a single WARAIT may be referred to below, it is understood that the principles may apply to multiple WARAITs.

Figure 6:
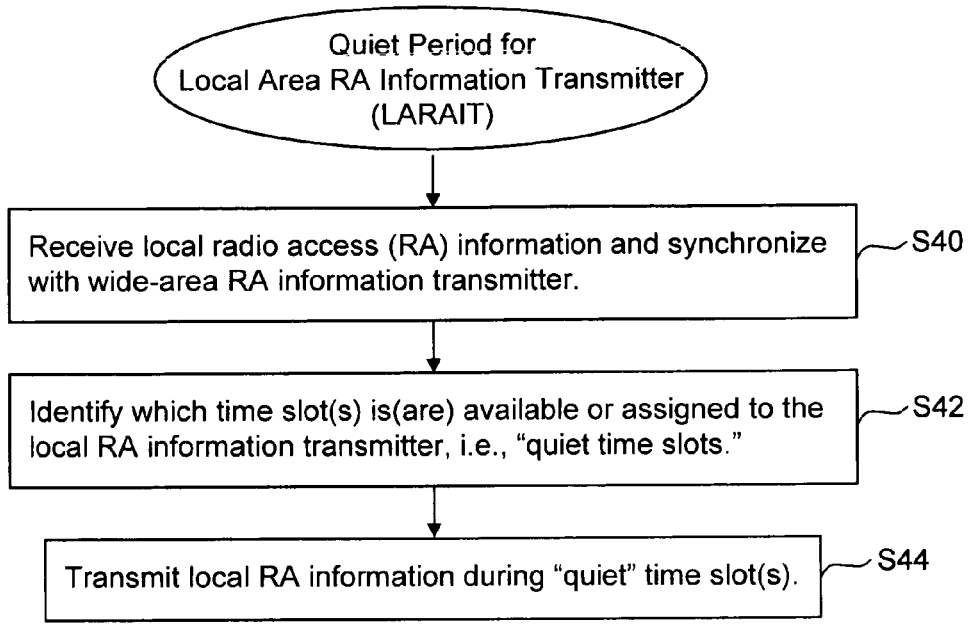
FIG. 6 illustrates a flowchart diagram with non-limiting example procedures for a local radio access information transmitter receiving information from a wide-area radio access information transmitter and transmit its local radio access information using "quiet" time periods.

FIG. 6 illustrates a flowchart diagram with non-limiting example procedures for a local radio access information transmitter listening to a wide-area radio access information transmitter and determining what resources are "quiet" time periods from the perspective of the WARAIT, i.e., what resources may be used for LARAIT transmissions. Although the example radio resource here is time slots, the procedures may also be applied to other or additional types of radio resources. The local radio access information transmitter receives local radio access information and synchronizes with a wide-area radio access information transmitter in order to match timing (step S40). The local radio access information transmitter identifies one or more "quiet" time slots not being used by the wide-area radio access information transmitter(s) that are available or assigned for use to the local radio access information transmitter (step S42). These time slots can be identified implicitly by LARAIT(s) listening to the WARAIT transmissions themselves and predicting what resources will be left quiet (e.g., if the WARAIT transmissions are periodic or if the length of the quiet periods are known), or the available WARAIT radio resource information can be explicitly transmitted by the WARAIT, e.g., broadcast. The quiet time slot(s) is(are) used by the local radio access information transmitter to transmit its local radio access information (step S44).

Figure 7:
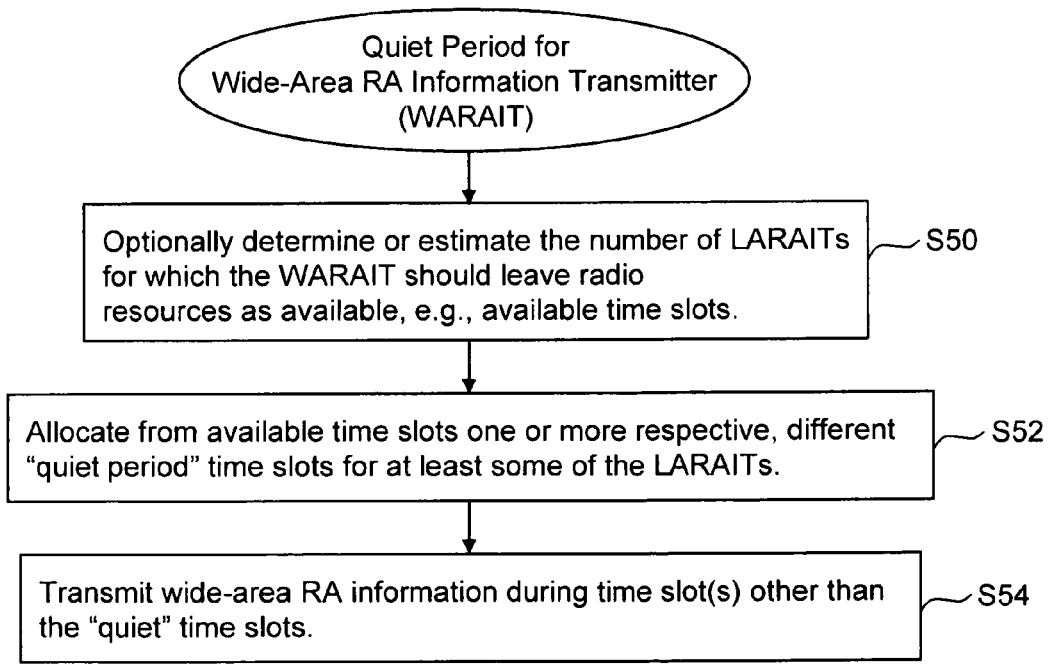
FIG. 7 illustrates a flowchart diagram with non-limiting example procedures for wide-area radio access information transmission in which "quiet" time periods are allocated for use by local radio access information transmitters.

FIG. 7 illustrates a flowchart diagram with non-limiting example procedures for wide-area radio access information transmission in which "quiet" time periods are allocated for use by local radio access information transmitters. Again, although the example radio resource here is time slots, the procedures may also be applied to other or additional types of radio resources. The wide-area radio access information transmitter may optionally obtain information on an expected number of local radio access information transmitters that are active in its service area (step S50). The WARAIT can, for example, make an estimate (e.g., depending on deployment scenario) or a number of LARAIT resources can be pre-configured. The pre-configuration may be regulated or standardized such that the WARAIT must leave a certain fraction of the radio resources unused to allow for LARAIT usage. The WARAIT allocates from its available time slots one or more respective, different "quiet period" time slots for each of at least some of the local radio access information transmitters that the wide-area radio access information transmitter will not use for its own transmissions (step S52). This allocation may optionally be based on the determination made in step S50. The wide-area radio access information transmitter transmits its own wide-area radio access information during time slot(s) other that the quiet time slot(s) (step S54). The WARAIT may optionally communicate the quiet time slots to some local radio access information transmitters in a WARAIT broadcast message.

Figure 8:
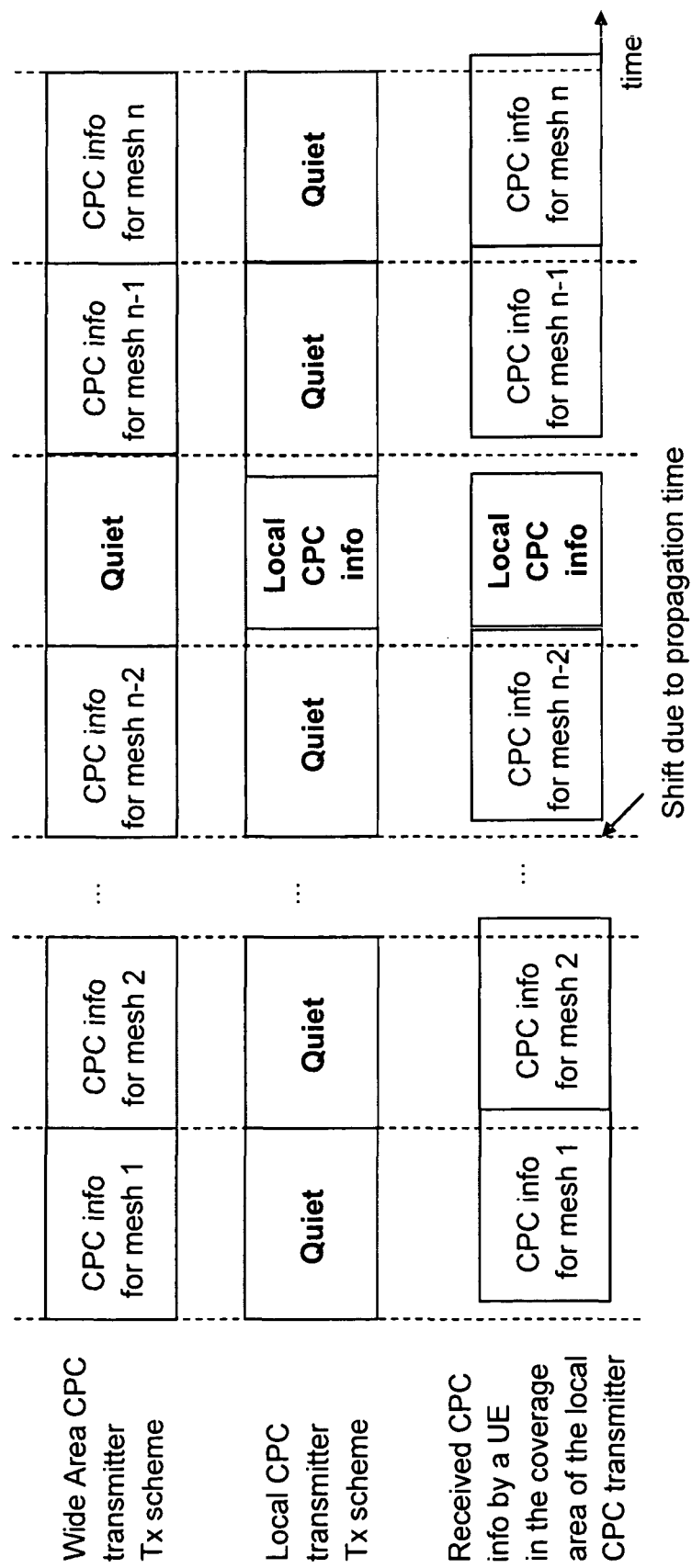
FIG. 8 illustrates a non-limiting example where a local radio access information transmitter transmits during quiet time periods in the wide-area radio access information transmission scheme.

FIG. 8 illustrates an example "quiet period" technique for allocating a time slot (as an example radio resource) to a local CPC access information transmitter. A wide-area CPC transmitter (meshed or not) identifies a silent period when it keeps quiet, i.e., ceases to transmit over at least some radio resources. This quiet period is then used by the local CPC transmitter to transmit its local CPC information.

In this way, receiving UEs within the service area of the local CPC transmitter obtain all of the wide-area CPC data sent from the wide-area CPC transmitter as well as the local CPC data sent from the local CPC transmitter. Although the spectrum utilization by the wide-area CPC transmitter is somewhat reduced since it sometimes has to be "quiet," the local CPC information is not subject to interference from the wide-area CPC transmitter.

The unused radio resources of the wide-area radio access information transmitter preferably permit multiple local radio access information transmitters to share those unused radio resources. For example, if the radio resource is a time slot, the quiet period where the wide-are transmitter is not transmitting may be made sufficiently long to permit transmission by multiple local radio access information transmitters. Other radio resource examples include reserving enough (orthogonal or non-orthogonal) codes or leaving a large enough part of the spectrum band unused. Any combination of the above resources may be used. The radio resource sharing may depend on which type of radio resource is left unused by the wide-area radio access information transmitter. Some non-limiting example approaches for radio resource sharing are described below.

One example is to use a code division multiple access (CDMA) scheme where the local radio access information transmitters use codes which may be orthogonal or non-orthogonal to other local radio access information transmitters. Orthogonal codes typically require some form of synchronization, which may make them less desirable from an implementation effort perspective for a distributed system. The number of codes may be selected based upon the length of the quiet period or the size of the available resources from the wide-area radio access information transmitters. In another approach, the number of codes, and possibly their configuration, may be provided by the wide-area radio access information transmitter. A direct sequence spread spectrum scheme may be used or a frequency hopping spread spectrum scheme. Another example approach is to leave multiple radio resources unused and allow a subset of the local radio access information transmitters to transmit. For each vacant radio resource chunk, a new subset may be randomized for diversity purposes.

The local radio access information transmitters may attempt to use the same radio resource, but implement a multiple access protocol that effectively deals with or to some extent avoids collisions, e.g., variants of slotted carrier sense multiple access (CSMA).

A game theory approach may be combined with sensing for other local radio access information transmitters to converge to a resource sharing scheme where the number of local radio access information transmitters would not change that often.

It may be helpful to know how many entities need to share a radio resource. One way of assessing this is to have each local radio access information transmitter mark its transmitted radio access information signal with a first identifier that identifies the signal as a local radio access information transmission and a second, unique (at least with a high probability) identifier (e.g., a random number). By detecting these identifiers, each local radio access information transmitter can determine how many local radio access information transmitters it needs to share the available radio resources with.

Figure 9:
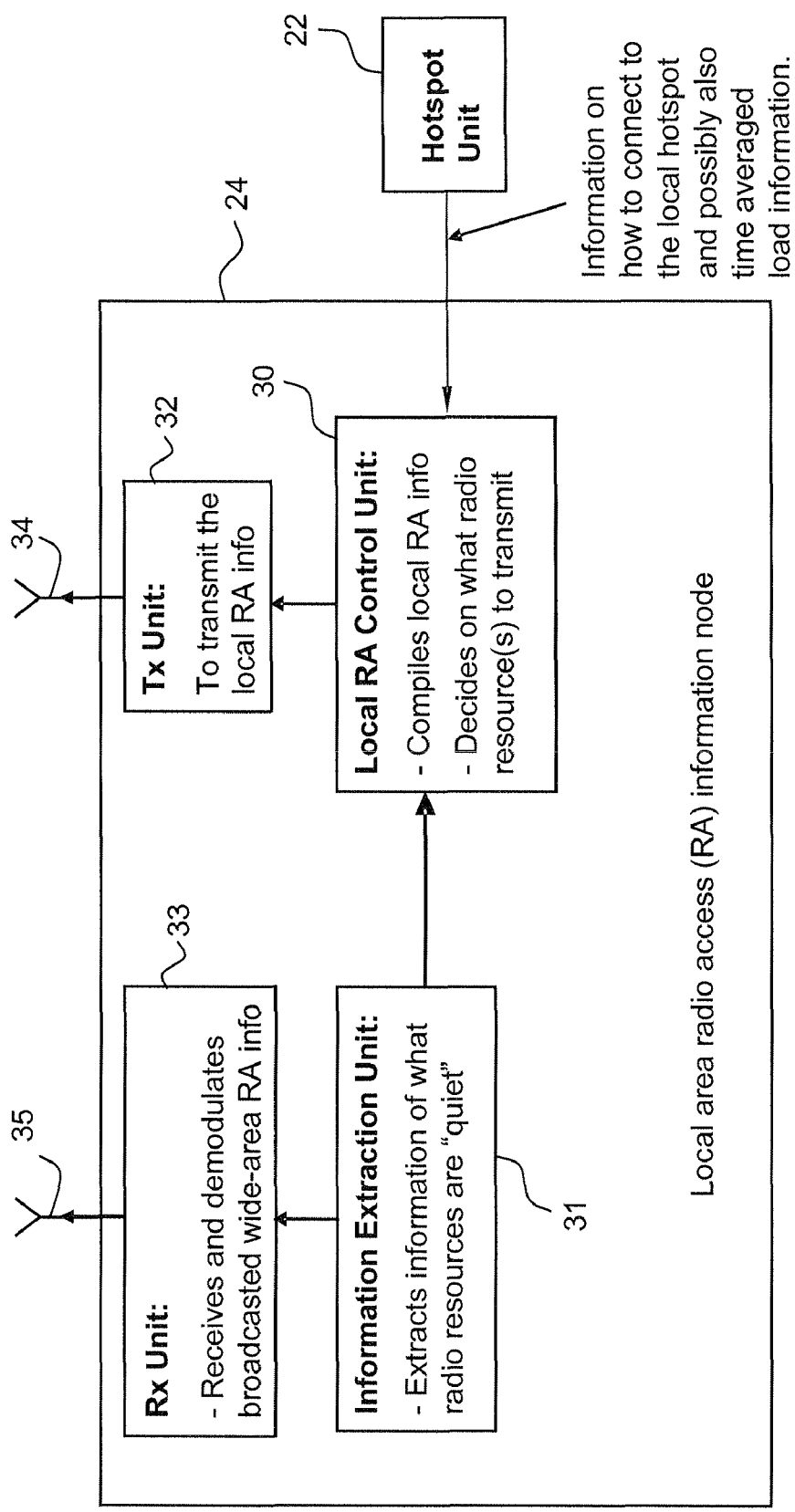
FIG. 9 illustrates a non-limiting example function block diagram of a local radio access information transmitter.

FIG. 9 illustrates a non-limiting example function block diagram of a local area radio access (RA) information node 24, The local radio access information node 24 includes a transmitter unit 32 coupled to one or more antennas 34 which in certain embodiments could be shared with the associated hotspot unit 22. A local control unit 30 is coupled to the transmitter 32 and contains interfaces for listening to and decoding wide-area radio access information transmissions and for communicating with one or several hotspot unit(s) 22. The hotspot unit 22 may provide information on how to connect and possibly also time averaged load information which could be relevant information for the UE for finding a connection with available resources. The to local control unit 30 compiles local radio access information for local broadcast via the transmitter unit 32 and antenna(s) 34. The local area radio access information node 24 also includes a receiver chain with a receive antenna 35 (though both receiver and transmitter could use the same antenna), a receiver unit 33, and an information extraction unit 31. The receiver unit 33 receives and demodulates broadcasted wide-area radio access information and possibly also radio access information and transmitter identifiers from other local area information transmitters with which node 24 needs to share radio resources. The information extraction unit 31 decodes and identifies in this non-limiting example radio resources of the wide-area radio access information transmitter allocated for use by local radio access information transmitters from the received wide-area broadcast. In one non-limiting example embodiment, the local radio access information node 24 could be a local CPC transmitter.

Figure 10:
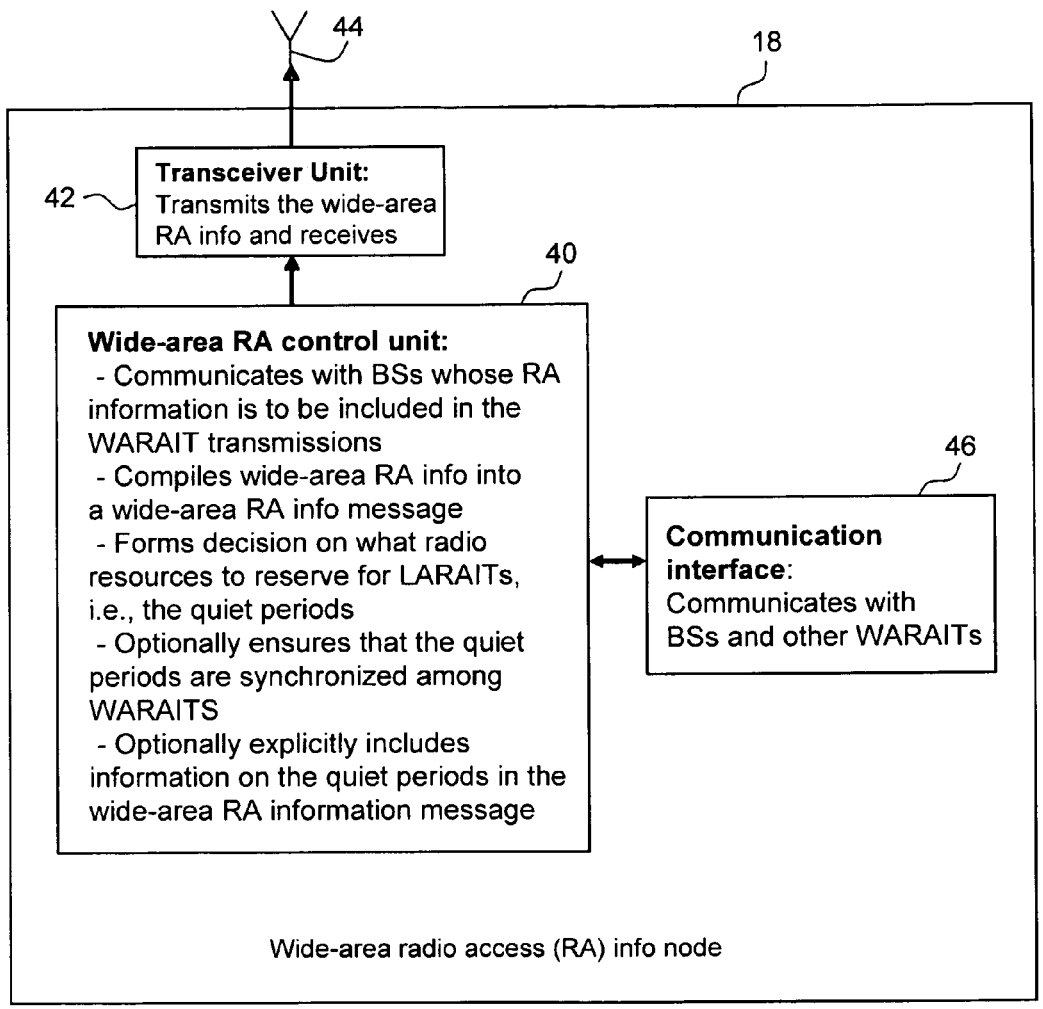
FIG. 10 illustrates a non-limiting example function block diagram of wide-area radio access information transmitter.

FIG. 10 illustrates a non-limiting example function block diagram of wide-area radio access information node 18. The wide-area radio access information node 18 includes a transmitter unit 42 coupled to one or more antennas 44 and a communication interface 46. A wide-area radio access (RA) control unit 40 is coupled to the transmitter 42. The wide-area RA control unit 40 could also be an external device connected to the wide-area radio access information node 18. The wide-area control unit 40 compiles wide-area radio access information for wide-area broadcast via the transmitter unit 42 and antenna(s) 44. It may also decide on what radio resources to transmit based on information from regulatory or agreed standards. For example, the wide area control unit 40 may be required to reserve a certain fraction of its radio resources for use by local area radio information transmitters. The size of that fraction may depend on the number of local area information transmitters in the service area of the wide area radio information transmitter or an estimate thereof. This number of local area information transmitters may be estimated, for example, from the population density in the service area of the wide-area radio access information transmitter by assuming that a predetermined number X of inhabitants will likely give incitement for deployment of a local area information transmitter. Such a number may be obtained by calculating the total number of inhabitants in the service area and dividing it by the predetermined number X. For a case where the "quiet periods" are quiet time slots, the WARAIT may, in one non-limiting example, decide to not transmit during a time period after the end of a transmission. The wide-area RA control unit 40 may also include explicit information in the broadcast wide-area access information message on the characteristics (e.g., which time slot, code, frequency, etc. is(are) left unused) of the "quiet periods" to aid local area information transmitters in determining which "quiet periods" to use for their transmissions. The communication interface 46 enables communication with the base stations (BSs) 14 associated with the WARAIT (i.e., the BSs for which the WARAIT transmits their respective RA information) and optionally communication with other WARAITs 18 to enable synchronized quiet periods. This communication interface 46 may be wired or wireless. In one non-limiting example embodiment, the wide-area radio access information transmitter could be a wide-area CPC transmitter.

The technology in this application offers many advantages. The required information for transmission of connection information related to each of many hotspots is reduced because that connection information is transmitted by the local radio access (RA) information transmitter(s). The technology is semi-distributed the sense that the wide-area RA information entity does not need to know which information is to be transmitted from each local RA entity or what LARAITs are present in its service area. This allows excellent scaling when many local hotspots are introduced.

In addition, the technology incentivizes a hotspot operator interested in advertising its hotspot to invest in a local RA information transmitter so that a continuous fee need not have to be paid to a wide-area RA information transmission operator. The local hotspot operator can be in full control of the local RA information.

If the local RA information transmitter is connected to the hotspot, it can provide instantaneous load information in the local RA information messages it broadcasts which allows UEs to take this information into account when choosing where to connect. This can improve user experience and QoS. Less advantageously, if hotspot load information is to be transmitted, another option is to transfer it to the wide-area CPC operator for transmission.

Another benefit is that UE positioning is not required to utilize the local RA information. Whenever a UE can "hear" the local RA information broadcast, the UE is typically in the service area of the local hotspot and is thus able to connect to it.

Additionally, the quiet period approach means that the WARAIT transmissions do not interfere with the local RA information transmissions which could otherwise be a problem for UEs on the border of the hotspot service areas (where the local RA information signal is weak). Moreover, in one example embodiment, there is no need for the WARAIT(s) to communicate available radio resources to the LARAITs. This enables a reduction in the communication overhead of the WARAIT(s). Alternatively, the WARAITs can communicate these resources in its broadcast messages without specifying which resources should be used by specific LARAITs.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A local area radio access information transmitter (LARAIT) for use in a communications area serviced by one or more different radio access technologies (RATs) allocated to different radio resources in different locations in the communications area, where each RAT is associated with one or more RAT radio transceivers for serving user equipments (UEs) at least in some portion of the communications area using at least one of the multiple RATs, the LARAIT being in addition to the RAT radio transceivers and located near or inside an associated hotspot service area at least partly inside the communications area, the LARAIT comprising:
   a receiver configured to receive broadcast information from a wide-area radio access information transmitter (WARAIT) having a set of WARAIT radio resources initially available for use by the WARAIT;
   processing circuitry configured to:
      determine local radio access information including one or more different RATs available for UE service in the hotspot service area and a frequency or frequencies of operation allocated to each RAT in the hotspot service area,
      determine from the set of WARAIT radio resources at least one WARAIT
   radio resource that the WARAIT is not using, and
   radio transmission circuitry configured to transmit the local area radio access information signals for receipt by UEs in the hotspot service area using the determined at least one WARAIT radio resource.

2. The LARAIT in claim 1, wherein the receiver is configured to receive signals from the WARAIT that explicitly identify one or more of the WARAIT radio resources not being used by the WARAIT transmitter.

3. The LARAIT in claim 1, wherein the receiver is configured to determine without explicit signaling from the WARAIT one or more of the WARAIT radio resources not being used by the WARAIT transmitter.

4. The LARAIT in claim 1, wherein the determined WARAIT radio resource includes one or more of a time period, a frequency band, or a code.

5. The LARAIT in claim 1, wherein the local radio access information transmitter is configured to share the at least one WARAIT radio resource with one or more other LARAITs in the communications area.

6. The LARAIT in claim 5, wherein the processing circuitry is configured to use a multiple access protocol to avoid a collision with the one or more other LARAITs when transmitting using the at least one WARAIT radio resource.

7. The local radio access information transmitter in claim 5, wherein the WARAIT has allocated multiple WARAIT radio resources for use by LARAIT, wherein the processing circuitry is configured to select a subset of the allocated multiple WARAIT radio resources, and wherein the radio transmission circuitry is configured to transmit the local area radio access information signals using the selected subset of the allocated multiple WARAIT radio resources.

8. The LARAIT in claim 1, wherein the processing circuitry is configured to generate signaling for transmission to another LARAIT to coordinate use of one or more WARAIT radio resources not being used by the WARAIT.

9. A method implemented in a local area radio access information transmitter (LARAIT) in a communications area serviced by one or more different radio access technologies (RATs) allocated to different radio resources in different locations in the communications area, where each RAT is associated with one or more RAT radio transceivers for serving user equipments (UEs) at least in some portion of the communications area using one of the multiple RATs, the method comprising:
   receiving broadcast information from a wide-area radio access information transmitter (WARAIT) having a set of WARAIT radio resources available for use by the WARAIT;
   determining local area radio access information including one or more different RATs available for UE service in a hotspot service area within the communications area and a frequency or frequencies of operation allocated to each RAT in the hotspot service area,
   determining from the set of WARAIT radio resources at least one WARAIT radio resource that the WARAIT is not using, and
   transmitting the local area radio access information signals for receipt by UEs in the hotspot service area using the determined at least one WARAIT radio resource.

10. The method claim 9, further comprising receiving signals from the WARAIT that explicitly identify one or more of the WARAIT radio resources not being used by the WARAIT transmitter.

11. The method claim 9, further comprising determining without explicit signaling from the WARAIT one or more of the WARAIT radio resources not being used by the WARAIT transmitter.

12. The method claim 9, wherein the determined WARAIT radio resource includes one or more of a time period, a frequency band, or a code.

13. The method in claim 9, further comprising signaling with another LARAIT to coordinate use of one or more WARAIT radio resources not being used by the WARAIT.

14. A wide-area radio access information transmitter (WARAIT) for use in a communications area serviced by multiple different radio access technologies (RATs) allocated to different radio resources in different locations in the communications area, where each RAT is associated with one or more RAT radio transceivers for serving user equipments (UEs) at least in some portion of the communications area using one of the multiple RATs, the wide-area radio access information transmitter comprising:

processing circuitry configured to determine wide-area radio access information including different RATs available for UE service in different locations in the communication area and one or more frequencies of operation allocated to each RAT in each location;

transmission circuitry configured to transmit the wide-area radio access information over the communications area using WARAIT radio resources, wherein the processing circuitry is configured to identify one or more WARAIT radio resources for possible use by one or more local area radio access information transmitters (LARAITs) and to control the transmission circuitry to transmit the wide-area radio access information over the communications area using only WARAIT radio resources not identified for possible use by any of the LARAITs.

15. The wide-area radio access information transmitter in claim 14, wherein each LARAIT is a cognition enabling pilot channel (CPC) transmitter and/or the WARAIT is a CPC transmitter and the hotspot service area is a region surrounding a dynamic spectrum access (DSA) hotspot device.

16. The wide-area radio access information transmitter in claim 14, wherein the WARAIT radio resources include one or more time slots, frequencies, or codes, or a combination of time slots, frequencies, or codes.

17. The wide-area radio access information transmitter in claim 14, wherein the processing circuitry is configured to allow the LARAIT to discover the identified one or more WARAIT radio resources.

18. The wide-area radio access information transmitter in claim 14, wherein the identified one or more WARAIT resources are specifically identified in the WARAIT transmissions.

19. A method in a wide-area radio access information transmitter (WARAIT) in a communications area serviced by multiple different radio access technologies (RATs) allocated to different radio resources in different locations in the communications area, where each RAT is associated with one or more RAT radio transceivers for serving user equipments (UEs) at least in some portion of the communications area using one of the multiple RATs, the method comprising:

determining wide-area radio access information including different RATs available for UE service in different locations in the communication area and radio resources allocated to each RAT in each location;

identifying one or more WARAIT radio resources for possible use by one or more of multiple local area radio access information transmitters (LARAITs); and transmitting the wide-area radio access information over the communications area using the WARAIT radio resources other than the identified one or more WARAIT radio resources.

20. The method in claim 19, wherein the WARAIT radio resources include time slots, frequencies, or codes, or a combination of time slots, frequencies, or codes.

21. The method in claim 19, further comprising allowing the LARAITs to discover the identified one or more WARAIT radio resources.

22. The method in claim 19, further comprising signaling the identified one or more WARAIT resources explicitly in the WARAIT transmissions.

23. The method in claim 19, further comprising signaling the identified one or more WARAIT radio resources for LARAIT use.

24. The method in claim 19, further comprising adding information to the WARAIT transmission on what radio resources and what type of radio resources are allowed for use by LARAITs.

* * * * *

UNITED STATES PATENT AND TRADEMARK OFFICE
CERTIFICATE OF CORRECTION

PATENT NO.         : 8,380,234 B2  
APPLICATION NO.    : 12/926855  
DATED              : February 19, 2013  
INVENTOR(S)        : Kronander et al.

It is certified that error appears in the above-identified patent and that said Letters Patent is hereby corrected as shown below:

In the Specification

In Column 2, Line 16, delete "RATS" and insert -- RATs --, therefor.

In Column 4, Line 17, delete "receiver to" and insert -- receiver --, therefor.

In Column 5, Line 30, delete "a to" and insert -- a --, therefor.

In Column 6, Line 41, delete "that to" and insert -- that --, therefor.

In Column 7, Line 58, delete "radio to" and insert -- radio --, therefor.

In Column 10, Line 47, delete "wide-are" and insert -- wide-area --, therefor.

In Column 11, Line 42, delete "The to" and insert -- The --, therefor.

In the Claims

In Column 13, Line 55, in Claim 1, delete "radio resource that the WARAIT is not using, and" and insert the same at Line 54 after "one WARAIT".

In Column 14, Line 12, in Claim 7, delete "local radio access information transmitter" and insert -- LARAIT --, therefor.

In Column 14, Line 48, in Claim 10, delete "claim" and insert -- in claim --, therefor.

In Column 14, Line 52, in Claim 11, delete "claim" and insert -- in claim --, therefor.

In Column 14, Line 56, in Claim 12, delete "claim" and insert -- in claim --, therefor.

Signed and Sealed this  
Twenty-sixth Day of November, 2013

Margaret A. Focarino  
*Commissioner for Patents of the United States Patent and Trademark Office*